(12) United States Patent
Ye et al.

(10) Patent No.: US 10,977,842 B2
(45) Date of Patent: Apr. 13, 2021

(54) METHOD FOR PROCESSING MULTI-DIRECTIONAL X-RAY COMPUTED TOMOGRAPHY IMAGE USING ARTIFICIAL NEURAL NETWORK AND APPARATUS THEREFOR

(71) Applicant: Korea Advanced Institute of Science and Technology, Daejeon (KR)

(72) Inventors: JongChul Ye, Daejeon (KR); Yoseob Han, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 59 days.

(21) Appl. No.: 16/431,575

(22) Filed: Jun. 4, 2019

(65) Prior Publication Data
US 2020/0027252 A1 Jan. 23, 2020

(30) Foreign Application Priority Data
Jun. 4, 2018 (KR) .................. 10-2018-0064077

(51) Int. Cl.
| | | |
|---|---|---|
| G06T 11/00 | (2006.01) | |
| G06T 5/00 | (2006.01) | |
| G06N 3/04 | (2006.01) | |
| G06N 3/08 | (2006.01) | |
| G01N 23/10 | (2018.01) | |
| G01N 23/083 | (2018.01) | |
| G01N 23/046 | (2018.01) | |

(52) U.S. Cl.
CPC .......... *G06T 11/006* (2013.01); *G01N 23/046* (2013.01); *G01N 23/083* (2013.01); *G01N 23/10* (2013.01); *G06N 3/04* (2013.01); *G06N 3/08* (2013.01); *G06T 5/002* (2013.01); *G06T 11/005* (2013.01); *G06T 2207/10081* (2013.01); *G06T 2207/20081* (2013.01); *G06T 2207/20084* (2013.01); *G06T 2207/30112* (2013.01); *G06T 2211/421* (2013.01)

(58) Field of Classification Search
CPC ..... G06T 11/006; G06T 5/002; G06T 11/005; G06T 2207/10081; G06T 2207/20081; G06T 2207/20084; G06T 2207/30112; G06T 2211/421; G01N 23/046; G01N 23/10; G01N 3/04; G01N 3/08
USPC ....................................................... 382/158
See application file for complete search history.

(56) References Cited

U.S. PATENT DOCUMENTS

| | | | |
|---|---|---|---|
| 2018/0018757 A1* | 1/2018 | Suzuki | ............. A61B 6/03 |
| 2019/0030371 A1* | 1/2019 | Han | ............. G16H 50/20 |
| 2019/0206095 A1* | 7/2019 | Xing | ............. G06T 11/003 |

OTHER PUBLICATIONS

Ye et al., "Deep Learning Reconstruction for 9-View Dual Energy CT Baggage Scanner," submitted Jan. 4, 2018.

* cited by examiner

*Primary Examiner* — Michael R Neff
(74) *Attorney, Agent, or Firm* — Marshall, Gerstein & Borun LLP

(57) ABSTRACT

A method for processing a multi-directional X-ray computed tomography (CT) image using a neural network and an apparatus therefor are provided. The method includes receiving a predetermined number of multi-directional X-ray CT data and reconstructing an image for the multi-directional X-ray CT data using a neural network learned in each of an image domain and a sinogram domain.

17 Claims, 7 Drawing Sheets

METHOD FOR PROCESSING MULTI-DIRECTIONAL X-RAY COMPUTED TOMOGRAPHY IMAGE USING ARTIFICIAL NEURAL NETWORK AND APPARATUS THEREFOR

CROSS-REFERENCE TO RELATED APPLICATIONS

A claim for priority under 35 U.S.C. § 119 is made to Korean Patent Application No. 10-2018-0064077 filed on Jun. 4, 2018, in the Korean Intellectual Property Office, the entire contents of which are hereby incorporated by reference.

BACKGROUND

Embodiments of the inventive concept described herein relate to a method for processing a multi-directional X-ray computed tomography (CT) image and an apparatus therefor, and more particularly, relate to an image processing method for reconstructing a multi-directional X-ray CT image as a high-quality image using a neural network learned in each of an image domain and a sinogram domain and an apparatus therefor.

As terrorist threats occur in nearby areas in our daily lives, security awareness is increasing day by day. Like such increased security awareness is reflected, the level of screening and security for baggage in various areas, particularly, railroads, harbors, and airports, is rising. A security system about general baggage in airports is a two-dimensional X-ray explosive detection system (2D EDS). The 2D EDS captures bidirectional X-ray images. An inspector inspects the fluoroscopy images and determines whether there is a risk. For the 2D EDS, there is a possibility that a detection rate about hidden dangerous objects will be degraded because of determining whether there is a risk of baggage based on the fluoroscopy images. To address such problems, a variety of research have been conducted.

In an existing technology, a stationary CT EDS uses fixed X-ray sources and detectors, making the system suitable for routine carry-on baggage inspection. FIGS. 1A and 1B are drawings illustrating source and detector geometry of the stationary CT EDS according to an embodiment. As shown in FIG. 1A, nine pairs of X-ray source and dual energy detector in the opposite direction are distributed at a certain angular interval. For seamless screening without stopping the convey belt, each pair of source and detector are arranged along the z-direction as shown in FIG. 1B so that different projection view data may be collected while the carry-on baggage moves continuously on the conveyor belt. Then, 9-view fan beam projection data is obtained for each z-slice by rebinning the measurement data. This type of stationary CT system is suitable for EDS applications because it does not require a rotating gantry, but with only 9 projection views it is difficult to use a conventional filtered-backprojection (FBP) algorithm due to severe streaking artifacts. Therefore, advanced reconstruction algorithms with fast reconstruction time are required.

In another existing technology, there is research using a sparse-view CT EDS, and this is the model-based iterative reconstruction (MBIR) of the CT system. Because of using a rotating gantry-based CT system, general CT EDS equipment gives the mechanical overload to a rotating gantry when driven during long time. Moreover, although the mechanical overload is ignored, because the MBIR should iteratively perform the CT system operator, a high operation time is taken. This has the limitation in being actually operated in railroads, harbors, and airports, which require a number of baggage screening during short time.

Recently, research on the CT reconstruction technique using the neural network has been actively conducted. It is known that the reconstruction technique using the neural network shows excellent performance although time for performing reconstruction is very short.

SUMMARY

Embodiments of the inventive concept provide an image processing method for reconstructing a multi-directional X-ray CT image as a high-quality image using a neural network learned in each of an image domain and a sinogram domain and an apparatus therefor.

Embodiments of the inventive concept provide an image processing method for reconstructing a multi-directional X-ray CT image captured from a stationary gantry-based 9-view CT explosive detection system (EDS) as a high-quality image using a neural network learned in each of an image domain and a sinogram domain and an apparatus therefor.

According to an exemplary embodiment, an image processing method may include receiving a predetermined number of multi-directional X-ray computed tomography (CT) data and reconstructing an image for the multi-directional X-ray CT data using a neural network learned in each of an image domain and a sinogram domain.

The reconstructing of the image may include obtaining initial reconstruction images from the multi-directional X-ray CT data using a predetermined analytic algorithm, denoising the initial reconstruction images using a neural network of the image domain, generating projection view data by projecting the denoised initial reconstruction images, obtaining sinogram data denoised from the projection view data using a neural network of the sinogram domain, and reconstructing the image for the multi-directional X-ray CT data from the denoised sinogram data using the analytic algorithm.

The neural network of the image domain may denoise the initial reconstruction images using a learning model for mapping between a predetermined artifact-corrupted image and model-based iterative reconstruction (MBIR) instruction in the image domain.

The neural network of the sinogram domain may provide the sinogram data denoised from the projection view data using a learning model for mapping between sinogram data and projection data in the sinogram domain.

The reconstructing of the image may include reconstructing the image using an analytic algorithm including a Feldkamp-Davis-Kress (FDK) algorithm and a filtered-backprojection (FBP) algorithm.

The neural network may include a convolutional framelet-based neural network.

The neural network may include a multi-resolution neural network including a pooling layer and an unpooling layer.

The neural network may include a bypass connection from the pooling layer to the unpooling layer.

The reconstructing of the image may include reconstructing the image for the multi-directional X-ray CT data by using the image reconstructed using a neural network of the image domain and a neural network of the sinogram domain as label data of the neural network of the image domain.

According to an exemplary embodiment, an image processing method may include receiving a predetermined number of multi-directional X-ray computed tomography (CT) data and reconstructing an image for the multi-directional X-ray CT data using a first neural network for a first learning model learned in an image domain, a second neural network for a second learning model learned in a sinogram domain, and a predetermined analytic algorithm.

According to an exemplary embodiment, an image processing device may include a reception unit that receives a predetermined number of multi-directional X-ray computed tomography (CT) data and a reconstruction unit that reconstructs an image for the multi-directional X-ray CT data using a neural network learned in each of an image domain and a sinogram domain.

The reconstruction unit may obtain initial reconstruction images from the multi-directional X-ray CT data using a predetermined analytic algorithm, may denoise the initial reconstruction images using a neural network of the image domain, may generate projection view data by projecting the denoised initial reconstruction images, may obtain sinogram data denoised from the projection view data using a neural network of the sinogram domain, and may reconstruct the image for the multi-directional X-ray CT data from the denoised sinogram data using the analytic algorithm.

The neural network of the image domain may denoise the initial reconstruction images using a learning model for mapping between a predetermined artifact-corrupted image and model-based iterative reconstruction (MBIR) instruction in the image domain.

The neural network of the sinogram domain may provide the sinogram data denoised from the projection view data using a learning model for mapping between sinogram data and projection data in the sinogram domain.

The reconstruction unit may reconstruct the image using an analytic algorithm including a Feldkamp-Davis-Kress (FDK) algorithm and a filtered-backprojection (FBP) algorithm.

The neural network may include a convolutional framelet-based neural network.

The neural network may include a multi-resolution neural network including a pooling layer and an unpooling layer.

The neural network may include a bypass connection from the pooling layer to the unpooling layer.

The reconstruction unit may reconstruct the image for the multi-directional X-ray CT data by using the image reconstructed using a neural network of the image domain and a neural network of the sinogram domain as label data of the neural network of the image domain.

According to an exemplary embodiment, an image processing method may include receiving computed tomography (CT) data and reconstructing an image for the CT data using a neural network learned in each of an image domain and a sinogram domain.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1A:
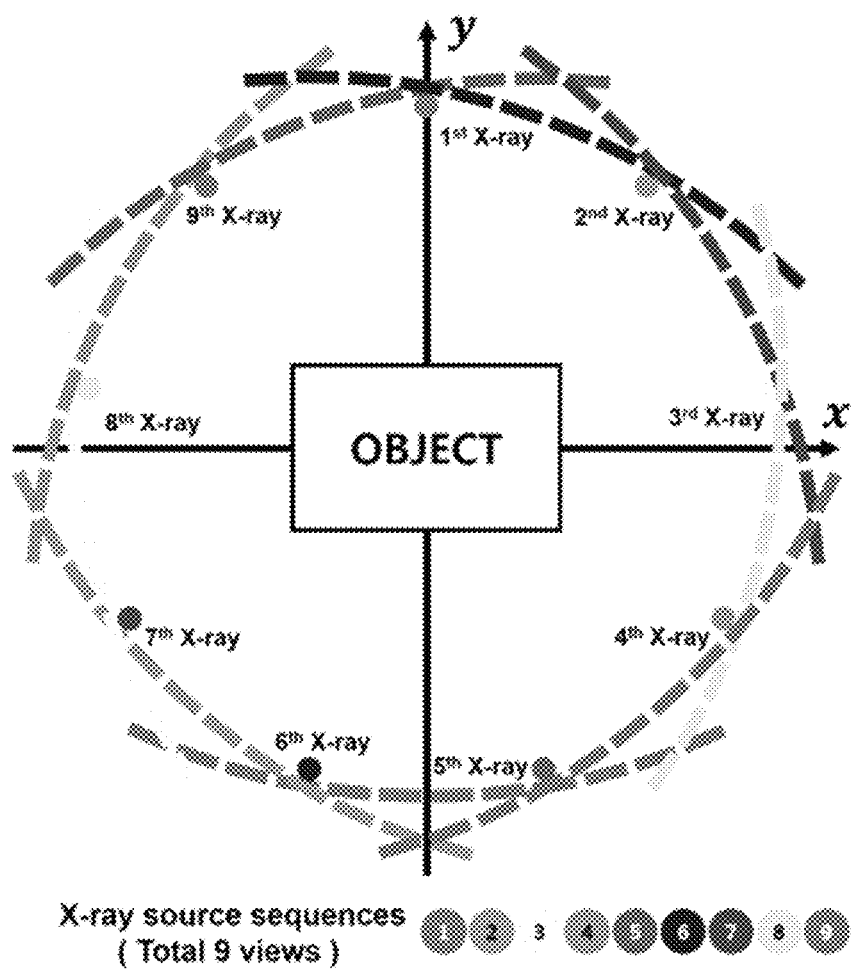
FIGS. 1A and 1B are drawings illustrating source and detector geometry of the stationary CT EDS according to an embodiment.
Figure 1B:
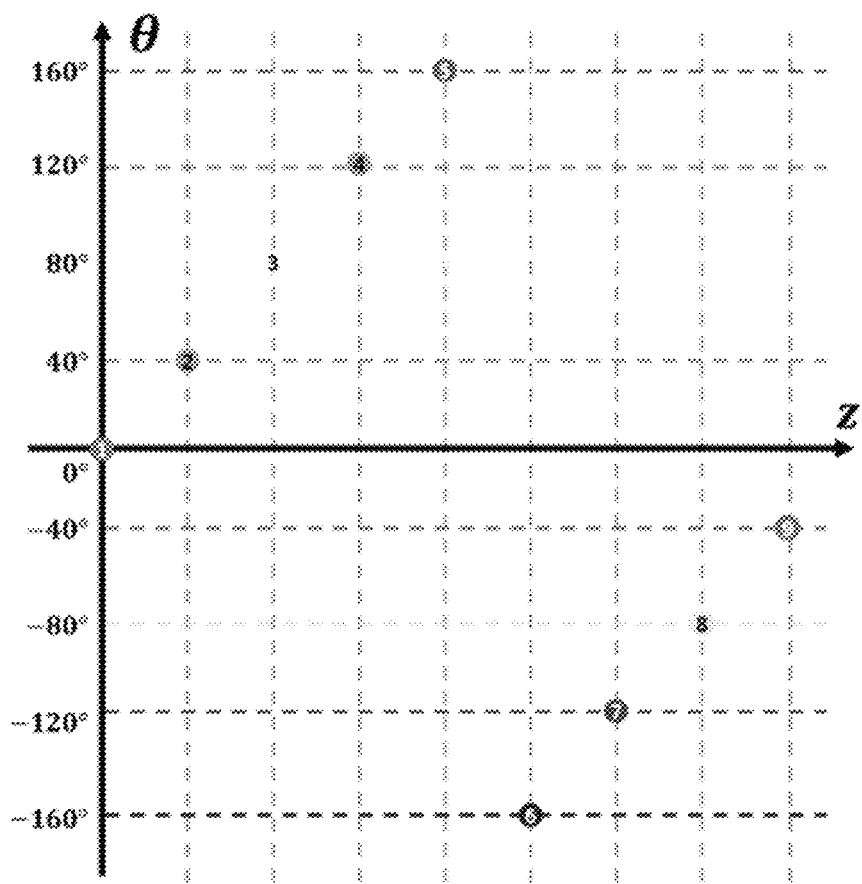

Advantages, features, and methods of accomplishing the same will become apparent with reference to embodiments described in detail below together with the accompanying drawings. However, the inventive concept is not limited by embodiments disclosed hereinafter, and may be implemented in various forms. Rather, these embodiments are provided to so that this disclosure will be through and complete and will fully convey the concept of the invention to those skilled in the art, and the inventive concept will only be defined by the appended claims.

Terms used in the specification are used to describe embodiments of the inventive concept and are not intended to limit the scope of the inventive concept. In the specification, the terms of a singular form may include plural forms unless otherwise specified. The expressions "comprise" and/or "comprising" used herein indicate existence of one or more other components, steps, operations, and/or elements other than stated, components, steps, operations, and/or elements but do not exclude presence of additional elements.

Unless otherwise defined herein, all terms (including technical and scientific terms) used in the specification may have the same meaning that is generally understood by a person skilled in the art. Also, terms which are defined in a dictionary and commonly used should be interpreted as not in an idealized or overly formal detect unless expressly so defined.

Hereinafter, a description will be given in detail of exemplary embodiments of the inventive concept with reference to the accompanying drawings. Like reference numerals are used for the same components shown in each drawing, and a duplicated description of the same components will be omitted.

It is common to construct a database including a pair of an original image and a distortion image, but it is mostly impossible to obtain an original image from a real field or a system which is already constructed or it is mostly very difficult to obtain the original image.

An embodiment of the inventive concept may be the gist of providing image processing technologies capable of enhancing reconstruction performance as compared with using an existing neural network in such a limited environment.

Herein, an embodiment of the inventive concept may reconstruct a high-quality image for a multi-directional X-ray CT data using a neural network learned in an image domain and a neural network learned in a sinogram domain.

In this case, the neural network used in an embodiment of the inventive concept may include a multi-resolution neural network including a pooling layer and an unpooling layer and may include a bypass connection from the pooling layer to the unpooling layer.

Figure 2:
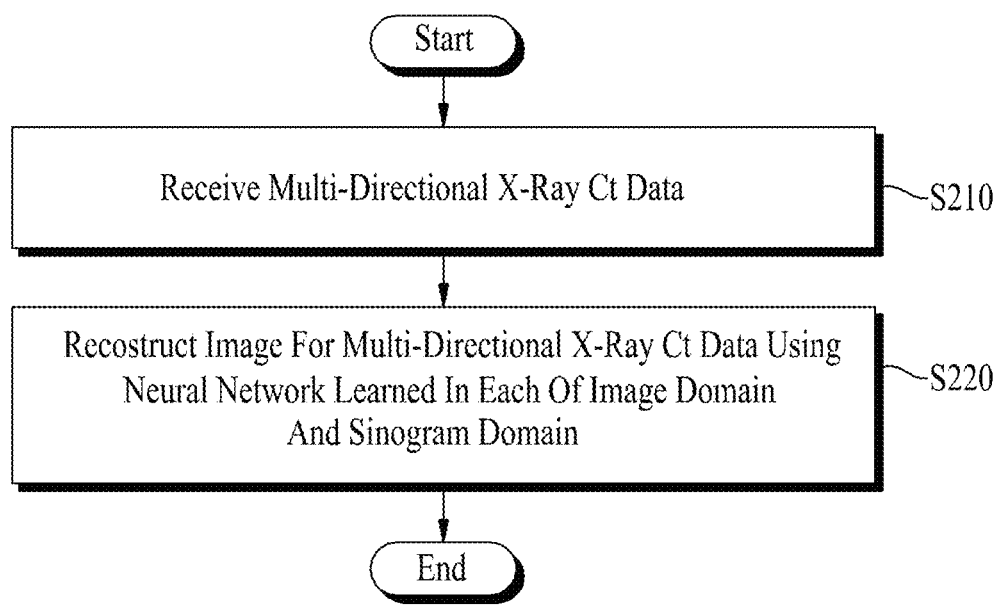
FIG. 2 is an operational flowchart illustrating an image processing method according to an embodiment of the inventive concept.

FIG. 2 is an operational flowchart illustrating an image processing method according to an embodiment of the inventive concept.

Referring to FIG. 2, the image processing method according to an embodiment of the inventive concept may receiving (S210) a multi-directional X-ray CT data, for example, 9-view X-ray CT data and reconstructing (S220) an image for the multi-directional X-ray CT data using a neural network learned in each of an image domain and a sinogram domain.

Herein, operation S220 may be to reconstruct the image for the multi-directional X-ray CT data using an analytic algorithm including a Feldkamp-Davis-Kress (FDK) algorithm and a filtered-backprojection (FBP) algorithm.

The neural network used in an embodiment of the inventive concept may include a convolutional framelet-based neural network and may include a multi-resolution neural network including a pooling layer and an unpooling layer.

Herein, the convolutional framelet may refer to a manner which represents an input signal using a local basis and a non-local basis.

In addition, the neural network may include a bypass connection from the pooling layer to the unpooling layer.

Figure 3:
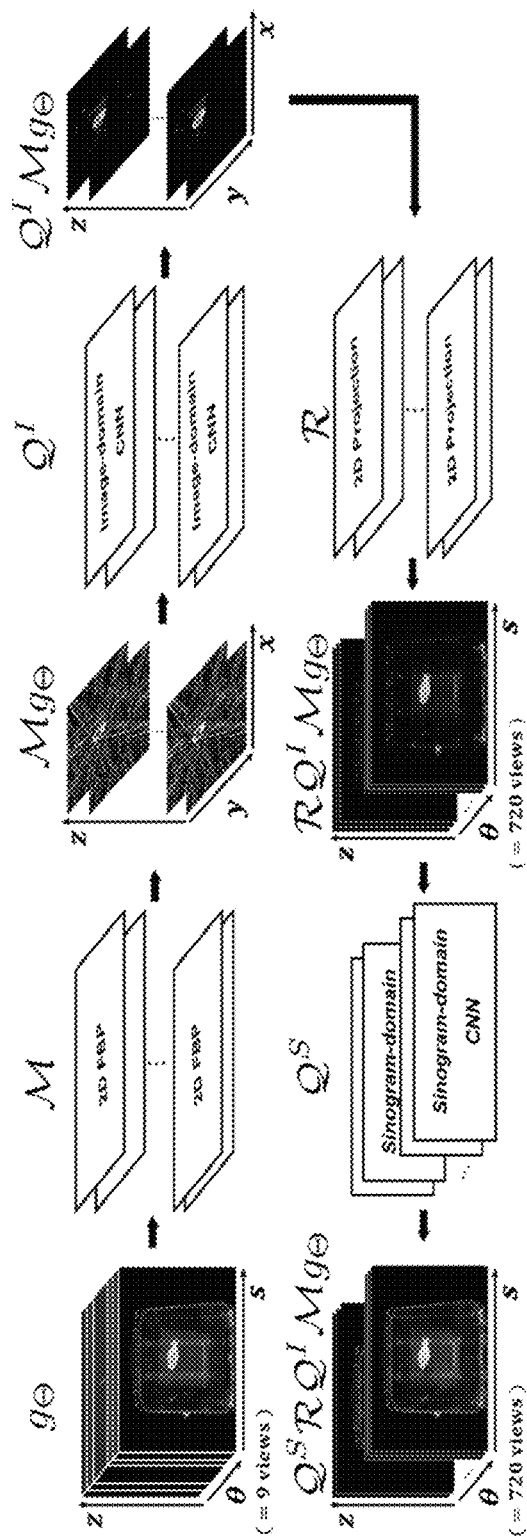
FIG. 3 is a drawing illustrating an example of an image processing method according to an embodiment of the inventive concept.

As shown in FIG. 3, operation S220 may be to obtain initial reconstruction images from the multi-directional X-ray CT data using a predetermined analytic algorithm, for example, the FBP algorithm, denoise the initial reconstruction images using the neural network of the image domain, generate projection view data by projecting the denoised initial reconstruction images, obtain sinogram data denoised from the projection view data using the neural network of the sinogram domain, and reconstruct a high-quality image for the multi-directional X-ray CT data from the denoised sinogram data using the analytic algorithm.

A description will be given of the method according to an embodiment of the inventive concept with reference to FIGS. 3 to 5. FIG. 3 is a drawing illustrating an example of an image processing method according to an embodiment of the inventive concept.

Problem Formulation

The forward model for sparse view CT EDS may be represented by Equation 1 below.

$$g_\Theta = \mathcal{P}_\Theta \mathcal{R} f \quad \text{[Equation 1]}$$

Herein, $\mathcal{R}$, denotes the 3D projection operator from an x-y-z volume image to s-θ-z domain sinogram data with s, θ, and z denoting the detector, projection angle, and the direction of the conveyor belt travel, respectively, and f is the input image and denotes the slice image of the x-y-z coordinate system, such as an axial image, a coronal image, and a sagittal image.

Describing the coordinate systems with reference to FIG. 3, $\mathcal{P}_\Theta$ in Equation 1 above denotes the view sampling operator for the measured angle set Θ, and $g_\Theta$ refers to the measured sinogram data. For each projection view data, an embodiment of the inventive concept may use the notation $g_\theta$ and $\mathcal{P}\theta$, where θ denotes the specific view (or viewpoint).

The main technical issue of the sparse view CT reconstruction is the non-uniqueness of the solution for Equation 1 above. More specifically, there exists a null space $\mathcal{N}_\Theta$ such that $\mathcal{P}_\Theta \mathcal{R} h = 0$, $\forall h \in \mathcal{N}_\Theta$ and this leads to an infinite number of feasible solutions. To avoid the non-uniqueness of the solution, the constrained form of the penalized MBIR may be formulated as Equation 2 below.

$$\min_{f \in \mathbb{R}^3} \|Lf\|_1, \text{ subject to } g_\Theta = \mathcal{P}_\Theta \mathcal{R} f \quad \text{[Equation 2]}$$

Herein, L refers to a linear operator and $\|\cdot\|_1$ denotes the $l_1$ norm.

For the case of the total variation (TV) penalty, L corresponds to the derivative. Then, the uniqueness of Equation 2 above is guaranteed that if the $\mathcal{N}_L \cap \mathcal{N}_\Theta = \{0\}$, where $\mathcal{N}_L$ denotes the null space of the operator L.

Instead of designing a linear operator L such that the common null space of $\mathcal{N}_\Theta$ and $\mathcal{N}_L$ is zero, an embodiment of the inventive concept may design a frame $\mathcal{W}$, its dual frame $\tilde{\mathcal{W}}$, and shrinkage operator $S_\lambda$ such that $\tilde{\mathcal{W}}^T \mathcal{W} = I$ and $\tilde{\mathcal{W}}^T S_\lambda \mathcal{W}(f^* + g) = f^* \forall g \in \mathcal{N}_\Theta$ for the ground-truth image f*. This frame-based regularization is also an active field of research for image denoising, inpainting, or the like. One of the most important contributions of the deep convolutional framelet theory is that $\mathcal{W}$ and $\tilde{\mathcal{W}}^T$ correspond to encoder and decoder structures of a convolutional neural network (CNN), respectively, and the shrinkage operator $S_\lambda$ emerges by controlling the number of filter channels and nonlinearities. More specifically, a convolutional neural network is designed such that $\mathcal{Q} = \tilde{\mathcal{W}}^T S_\lambda \mathcal{W}$ and to be Equation 3 above.

$$\mathcal{Q}(f^* + h) = f^*, \forall h \in \mathcal{N}_\Theta \quad \text{[Equation 3]}$$

In other word, Equation 3 above directly removes the null space component. Equation 3 above may be the constraint used for training the neural network.

Derivation of Image and Projection Domain CNNs

The sparse view reconstruction algorithm according to an embodiment of the inventive concept finds the unknown f∈ $\mathbb{R}^3$ that satisfy both data fidelity and the so-called frame constraints like Equation 4 below.

$$g_\Theta = \mathcal{P}_\Theta \mathcal{R} f, \quad \mathcal{Q}^I(f) = f^* \quad \text{[Equation 4]}$$

Herein, $\mathcal{Q}^I$ is the image domain CNN that satisfies Equation 3 above and f* denotes the ground-truth images that are available for training data.

For example, by defining $\mathcal{M}$ as a right inverse of $\mathcal{P}_\Theta \mathcal{R}$, i.e. $(\mathcal{P}_\Theta \mathcal{R})\mathcal{M} g_\Theta = g_\Theta$, $\forall g_\Theta$, an embodiment of the inventive concept has $\mathcal{M} g_\Theta = f^* + h$ for some $h \in \mathcal{N}_\Theta$, since the right inverse is not unique due to the existence of the null space. Thus, an embodiment of the inventive concept may show that $\mathcal{M} g_\Theta$ is the feasible solution for Equation 4 above, since an embodiment of the inventive concept has Equation 5 below and Equation 6 below for the training data.

$$\mathcal{Q}^I \mathcal{M} g_\Theta = \mathcal{Q}^I(f^* + h) = f^* \quad \text{[Equation 5]}$$

$$\mathcal{P}_\Theta \mathcal{R} \mathcal{M} g_\Theta = \mathcal{P}_\Theta \mathcal{R}(f^* + h) = g_\Theta \quad \text{[Equation 6]}$$

Therefore, the neural network training problem to satisfy Equation 4 above may be equivalently represented by Equation 7 below.

$$\min_{Q^I} \sum_{i=1}^{N} \|f^{*(i)} - Q^I \mathcal{M} g_\Theta^{(i)}\|^2 \qquad \text{[Equation 7]}$$

Herein, $\{(f^{*(i)}, g_\Theta^{(i)})\}_{i=1}^{N}$ denotes the training data set composed of the ground-truth image and its sparse view projection.

Since a representative right inverse for the sparse view projection is the inverse Radon transform after zero padding to the missing view, $\mathcal{M} g_\Theta^{(i)}$ in Equation 7 above may be implemented using the standard FBP algorithm. In fact, this is the main theoretical ground for the success of image domain CNN when the ground-truth data is available. Moreover, the fan-beam rebinning makes the problem separable for each z slice, so an embodiment of the inventive concept may use the 2D FBP for each slice as shown in FIG. 3.

However, the main technical difficulties in the 9-view CT EDS is that an embodiment of the inventive concept does not have ground-truth image $\{f^{*(i)}\}_{i=1}^{N}$. One may use physical phantoms and atomic number to form a set of ground-truth images, but those datasets need a new method to account for the lack of ground-truth for neural network training because they are able to differ from realistic carry-on bags. Thus, to overcome the lack of the ground-truth data, the approximate label images are generated using an MBIR with TV penalty. Then, using MBIR reconstruction as label data $\{f^{*(i)}\}_{i=1}^{N}$, an 2D image domain network $\mathcal{Q}^I$ may be trained to learn the mapping between the artifact-corrupted 2D image and MBIR reconstruction in x-y domain. In other words, the 2D image domain network $\mathcal{Q}^I$ may generate a learning model for the mapping between the artifact-, for example, the linear artifact-corrupted 2D image and MBIR reconstruction in an image domain through training and may provide the denoised image using the generated learning model.

One downside of this approach is that the network training by Equation 7 above is no more optimal, since the label data is not the ground-truth image. Thus, the generated sinogram data from the denoised 3D volume may be biased. Thus, an embodiment of the inventive concept may impose additional frame constraints to the sinogram data in addition to Equation 4 above to be represented as Equation 8 below.

$$g^*_\theta = \mathcal{M}^S(g_\theta) \qquad \text{[Equation 8]}$$

Herein, $\mathcal{M}^S$ is the s-z sinogram domain CNN and $g^*_\theta$ denotes the ground-truth sinogram data measured at the angle $\theta$. In other words, Equation 8 above refers to an equation for the measured angle $\theta$. Equation 8 above leads to the following network training such as Equation 9 below.

$$\min_{Q^S} \sum_{\theta \in \Theta} \sum_{i=1}^{N} \|g_\theta^{*(i)} - Q^S(\mathcal{P}_\theta \mathcal{R} Q^I \mathcal{M} g_\Theta^{(i)})\|^2 \qquad \text{[Equation 9]}$$

More specifically, as shown in FIG. 3, 3D sinogram data is generated in the s-θ-z domain by applying the forward projection operator along 720-projection views after stacking the image domain network output over multiple slices to form 3D reconstruction volume in the x-y-z domain. Next, a 2D sinogram domain network $\mathcal{M}^S$ is trained so that it may learn the mapping between the synthetic s-z sinogram data and the real projection data in the s-z domain. In other words, the 2D sinogram domain network $\mathcal{M}^S$ may generate a learning model for the mapping between the sinogram data and the projection data in the sinogram domain and may provide the denoised sinogram data using the generated learning model. Since the real projection data is available only in 9 views, this sinogram network training is performed using synthetic and real projection data in the measured projection views. The optimization problems, Equations 7 and 9, may be solved sequentially or simultaneously, and an embodiment of the inventive concept may adopt the sequential optimization approach.

After the neural networks $\mathcal{M}^I$ and $\mathcal{M}^S$ are trained, the inference may be done simply by obtaining x-y-z volume images from the 9 view projection data by the slice-by-slice FBP algorithm, which are then fed into $\mathcal{M}^I$ to obtain the denoised 3D volume data. Then, by applying the projection operator, an embodiment of the inventive concept may generate 720 projection view data on s-θ-z domain, which are fed into the $\mathcal{M}^S$ to obtain denoised sinogram data for each angle θ. Then, the final reconstruction may be obtained by applying FBP algorithms. An embodiment of the inventive concept may use post-processing using additional TV-based denosing.

As such, as shown in FIG. 3, the method according to an embodiment of the inventive concept may be to obtain an image sufficiently interpolated in the projection domain by passing an image reconstructed using an analytic reconstruction method, for example, the FBP algorithm for a certain number of obtained projection data, for example, 9 projection data, through the neural network of the image domain and to transmit the primarily interpolated image data to the projection domain using a projection operator. In this case, the projection data may be expanded to a degree capable of being sufficiently reconstructed with the analytic reconstruction method, for example, 720 projection data, rather than generating 9 projection data. The projection data obtained as a sufficient number of projection data may pass through the neural network of the sinogram domain to obtain projection data with improved quality, and the obtained projection data with the improved quality may be reconstructed as the final image by means of the FBP algorithm.

Real CT EDS Data Acquisition

An embodiment of the inventive concept may collect CT EDS data using the stationary 9 view dual energy CT-EDS system, for example, the stationary 9 view dual energy CT-EDS system developed by GEMSS Medical Systems, as shown in FIG. 1A. The distance from source to detector (DSD) and the distance from source to object (DSO) are 1202.6 mm and 648.2 mm, respectively. The number of detectors is 384 with a pitch of 1.5 mm. The region of interest (ROI) is 256×256 and the pixel size is 2 mm². The detectors collect low energy X-ray and high energy X-ray at 80 KVp and 120 KVp, respectively.

An embodiment of the inventive concept may collect 47 sets of projection data from the CT EDS baggage scanner. Among the 47 sets, 32 datasets are simple-objects and the other sets are realistic carry-on bags. The 47 sets of 28 simple- and 13 baggage-objects may be used during the training phase, and the validation may be performed by two simple-objects and one baggage-object.

Network Architecture and Training

Figure 4:
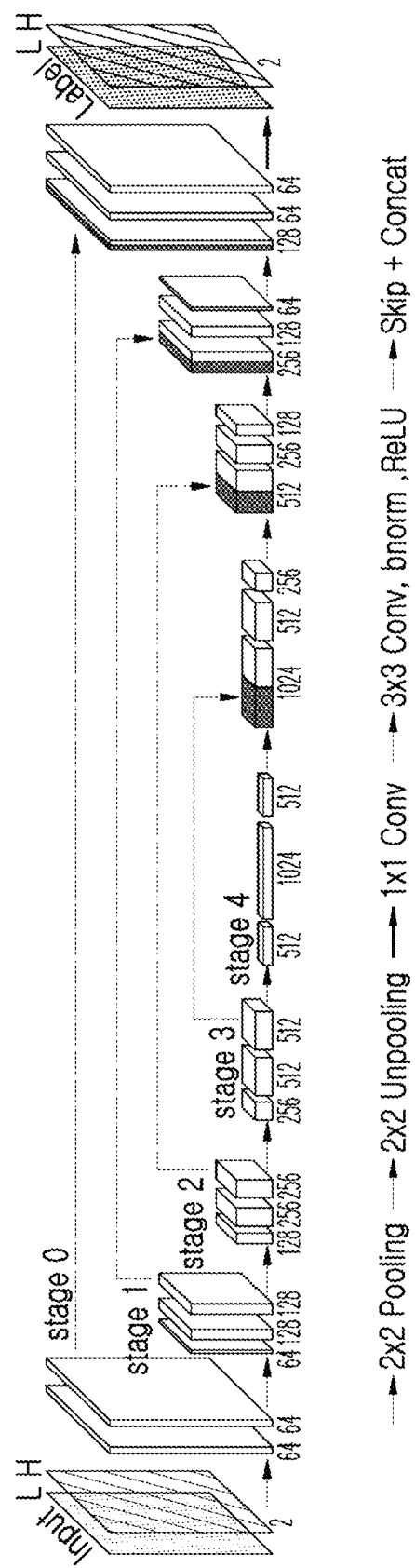
FIG. 4 is a drawing illustrating a modified U-Net structure for image and sinogram domain networks.

FIG. 4 is a drawing illustrating a modified U-Net structure for image and sinogram domain networks. As shown in FIG.

4, to account for the multi-energy image and sinogram data, the input for the network is two channel multi-energy image and sinogram data.

The network according to an embodiment of the inventive concept includes a convolution layer for performing the linear transform operation, a batch normalization layer for performing the normalization operation, a rectified linear unit (ReLU) layer for performing the nonlinear function operation, and a contracting path connection with concatenation. Specifically, each stage may include four sequential layers composed of convolution with 3×3 kernels, batch normalization, and ReLU layers. The last stage may include two sequential layers and the last layer. The last layer may include only the convolution layer with 1×1 kernel. The number of channels for each convolution layer is illustrated in FIG. 4. The number of channels may be doubled after each pooling layer.

The networks according to an embodiment of the inventive concept may be trained by stochastic gradient descent (SGD). The regularization parameter may be $\lambda=10^{-4}$. The learning rate may be set from $10^{-3}$ to $10^{-5}$, which is reduced step by step in each epoch. The number of epochs may be 200. The batch size may be 12 and the patch sizes for image and projection data may be 256×256×2 and 768×384×2, respectively. The network may be implemented using MatConvNet toolbox in the MATLAB 2015a environment.

As shown in FIG. 4, the U-Net in an embodiment of the inventive concept plays a role in transmitting a signal of an input unit to an output unit by using the average pooling layer and the average unpooling layer as non-local base and through a bypass connection layer. The U-Net is recursively applied to the low-resolution signal. Herein, the input is first filtered with local convolutional filters, which is then reduced to a half size approximate signal using a pooling operation. The bypass connection may compensate for the lost high frequency during pooling.

Figure 5:
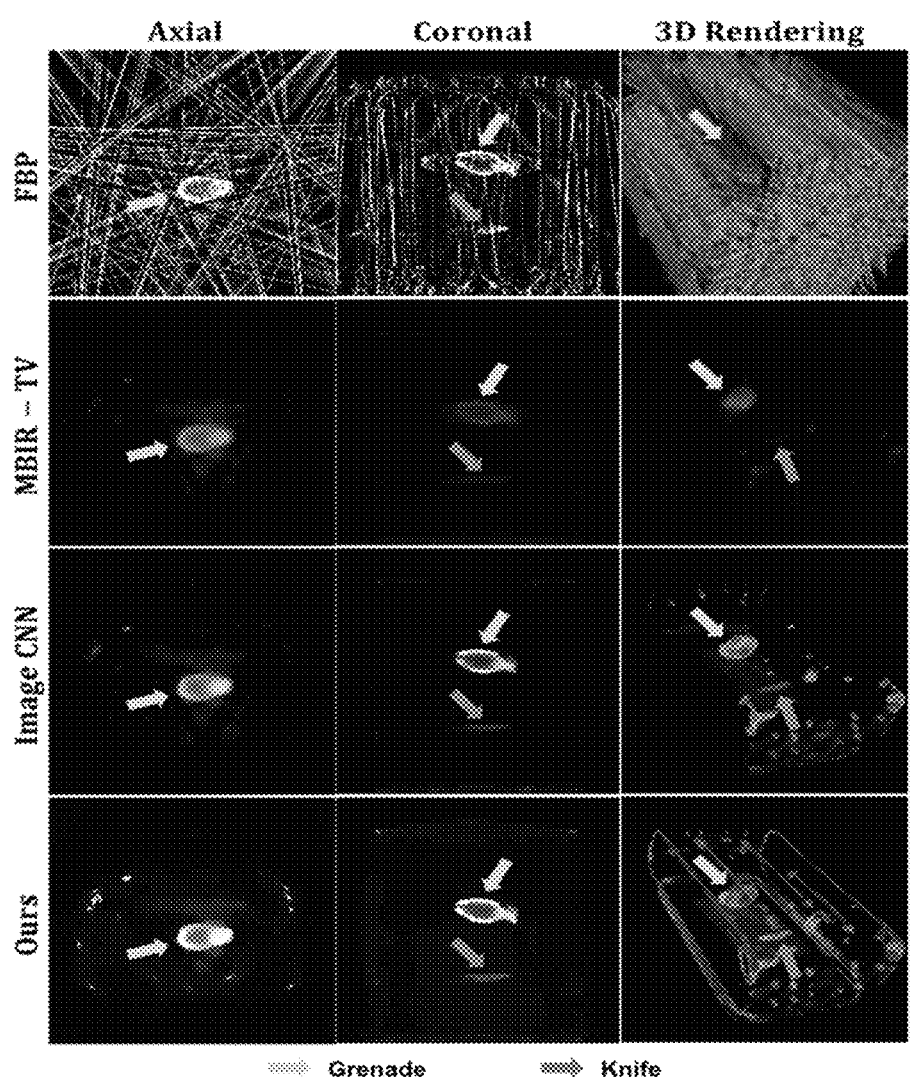
FIG. 5 is a drawing illustrating an example of comparing image reconstructions results for a method according to an embodiment of the inventive concept and existing methods.

FIG. 5 is a drawing illustrating an example of comparing image reconstructions results for a method according to an embodiment of the inventive concept and existing methods. FIG. 5 illustrates a comparison of image reconstruction results of the method (ours) according to an embodiment of the inventive concept, the analytic reconstruction technique (FBP), the iterative reconstruction technique (MBIR), and the image domain neural network (image CNN).

As shown in FIG. 5, the FBP reconstruction results suffer from severe streaking artifacts, so it is impossible to see a certain internal structural form in the tomographic reconstruction and 3D rendering. The MBIR reconstruction results are possible in seeing an internal structural form, but show the problem in which reconstruction is not done because a boundary portion of the object is crushed or because the object having small contrast disappears. The image domain CNN is better than the MBIR in quality of the reconstruction image, but the frame or zipper of the detailed bag is not reconstructed. In other words, the MBIR and the image domain CNN are slight better than the FBP in quality of their reconstruction images, but the detailed 3D structures are not fully recovered and several objects are not detected as indicated by the red arrow in FIG. 5. On the other hand, in the method according to an embodiment of the inventive concept, the 3D rendering results correctly identify the shape of grenade and knife as well as the frame of the bag, which is not possible using other methods. In other words, in the method according to an embodiment of the inventive concept, the resolution of the image is better, and the frame of the bag and the detailed element such as the zipper are reconstructed.

Because an embodiment of the inventive concept does not have the ground-truth image in the image domain, it may perform quantitative evaluation using normalized mean square error (NMSE) in the sinogram domain. More specifically, after obtaining the final reconstruction, an embodiment of the inventive concept may perform the forward projection to generate the sinogram data in the measured projection view and may calculate the NMSE.

As such, the method according to an embodiment of the inventive concept may reconstruct a multi-directional X-ray CT image as a high-quality image using a neural network learned in each of an image domain and a sinogram domain.

Furthermore, because image reconstruction is possible using the neural network, the method according to an embodiment of the inventive concept may replace various applications which perform image reconstruction by means of the existing iterative reconstruction technique with an application which performs image reconstruction using the iterative reconstruction technique. For example, an embodiment of the inventive concept is applicable to medical CT equipment as well as the baggage scanner.

Because the medical CT equipment is the same mathematical model-based equipment as the baggage scanner, this is applicable to an embodiment of the inventive concept, thus overcoming the limit shown in the existing technologies.

Moreover, the method according to an embodiment of the inventive concept may enhance reconstruction performance as well as a reconstruction speed by reconstructing the multi-directional X-ray CT image using the neural network. In other words, for the image reconstruction technique using the iterative reconstruction technique, the reconstruction performance thereof deteriorates for a long reconstruction time, but an embodiment of the inventive concept may enhance reconstruction performance as well as a reconstruction speed by reconstructing the image using the neural network.

In addition, the method according to an embodiment of the inventive concept may perform quicker image reconstruction than image reconstruction using only the neural network of the image domain and the neural network of the sinogram domain by using the image finally reconstructed by the neural network of the image domain and the neural network of the sinogram domain again as label data of the neural network of the image domain.

In addition, the method according to an embodiment of the inventive concept is not limited to reconstructing the multi-directional X-ray CT image and is applicable to image data including the image domain and the sinogram domain, for example, all types of image data capable of reconstructing a high-resolution CT image from CT image.

For example, a method according to another embodiment of the inventive concept may receive CT data and may reconstruct an image for the CT data using a neural network learned in each of an image domain and a sinogram domain. Of course, a detailed process of reconstructing the image for the CT data using the neural network is applicable to a process of reconstructing a multi-directional X-ray CT image as a high-quality image.

Figure 6:
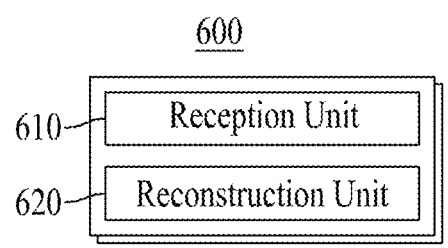
FIG. 6 is a block diagram illustrating a configuration of an image processing device according to an embodiment of the inventive concept.

FIG. 6 is a block diagram illustrating a configuration of an image processing device according to an embodiment of the inventive concept. FIG. 6 illustrates a configuration of a device which performs the method of FIGS. 2 to 5.

Referring to FIG. 6, an image processing device 600 according to an embodiment of the inventive concept may include a reception unit 610 and a reconstruction unit 620.

The reception unit 610 may receive a predetermined number of multi-directional X-ray CT data.

Herein, the reception unit 610 may receive 9-view X-ray CT data.

The reconstruction unit 620 may reconstruct an image for the multi-directional X-ray CT data using a neural network learned in each of an image domain and a sinogram domain.

In this case, the reconstruction unit 620 may obtain initial reconstruction images from the multi-directional X-ray CT data using a predetermined analytic algorithm, may denoise the initial reconstruction images using the neural network of the image domain, may generate projection view data by projecting the denoised initial reconstruction images, may obtain sinogram data denoised from the projection view data using the neural network of the sinogram domain, and may reconstruct the image for the multi-directional X-ray CT data from the denoised sinogram data using the analytic algorithm.

The neural network of the image domain, used in the reconstruction unit 620, may denoise the initial reconstruction images using a learning model for mapping between a predetermined artifact-corrupted image and model-based iterative reconstruction (MBIR) reconstruction in the image domain.

Moreover, the neural network of the sinogram domain, used in the reconstruction unit 620, may provide sinogram data denoised from the projection view data using a learning model for mapping between sinogram data and projection data in the sinogram domain.

In addition, the reconstruction unit 620 may reconstruct the image using an analytic algorithm including a Feldkamp-Davis-Kress (FDK) algorithm and a filtered-backprojection (FBP) algorithm.

The neural network may include a convolutional framelet-based neural network and may include a multi-resolution neural network including a pooling layer and an unpooling layer.

In addition, the neural network may include a bypass connection from the pooling layer to the unpooling layer.

Such an image processing device 600 according to an embodiment of the inventive concept is applicable to a stationary CT EDS.

It is apparent to those skilled in the art that, although the description is omitted in the image processing device 600 of FIG. 6, the respective components configuring FIG. 6 may include all details described in FIGS. 2 to 5.

The foregoing devices may be realized by hardware elements, software elements and/or combinations thereof. For example, the devices and components illustrated in the exemplary embodiments of the inventive concept may be implemented in one or more general-use computers or special-purpose computers, such as a processor, a controller, an arithmetic logic unit (ALU), a digital signal processor, a microcomputer, a field programmable array (FPA), a programmable logic unit (PLU), a microprocessor or any device which may execute instructions and respond. A processing unit may implement an operating system (OS) or one or software applications running on the OS. Further, the processing unit may access, store, manipulate, process and generate data in response to execution of software. It will be understood by those skilled in the art that although a single processing unit may be illustrated for convenience of understanding, the processing unit may include a plurality of processing elements and/or a plurality of types of processing elements. For example, the processing unit may include a plurality of processors or one processor and one controller. Also, the processing unit may have a different processing configuration, such as a parallel processor.

Software may include computer programs, codes, instructions or one or more combinations thereof and may configure a processing unit to operate in a desired manner or may independently or collectively control the processing unit. Software and/or data may be permanently or temporarily embodied in any type of machine, components, physical equipment, virtual equipment, computer storage media or units or transmitted signal waves so as to be interpreted by the processing unit or to provide instructions or data to the processing unit. Software may be dispersed throughout computer systems connected via networks and may be stored or executed in a dispersion manner. Software and data may be recorded in one or more computer-readable storage media.

The methods according to the above-described exemplary embodiments of the inventive concept may be implemented with program instructions which may be executed through various computer means and may be recorded in computer-readable media. The media may also include, alone or in combination with the program instructions, data files, data structures, and the like. The program instructions recorded in the media may be designed and configured specially for the exemplary embodiments of the inventive concept or be known and available to those skilled in computer software. Computer-readable media include magnetic media such as hard disks, floppy disks, and magnetic tape; optical media such as compact disc-read only memory (CD-ROM) disks and digital versatile discs (DVDs); magneto-optical media such as floptical disks; and hardware devices that are specially configured to store and perform program instructions, such as read-only memory (ROM), random access memory (RAM), flash memory, and the like. Program instructions include both machine codes, such as produced by a compiler, and higher level codes that may be executed by the computer using an interpreter. The described hardware devices may be configured to act as one or more software modules to perform the operations of the above-described exemplary embodiments of the inventive concept, or vice versa.

While a few exemplary embodiments have been shown and described with reference to the accompanying drawings, it will be apparent to those skilled in the art that various modifications and variations can be made from the foregoing descriptions. For example, adequate effects may be achieved even if the foregoing processes and methods are carried out in different order than described above, and/or the aforementioned elements, such as systems, structures, devices, or circuits, are combined or coupled in different forms and modes than as described above or be substituted or switched with other components or equivalents.

Therefore, other implements, other embodiments, and equivalents to claims are within the scope of the following claims.

What is claimed is:

1. An image processing method, comprising:
   receiving a predetermined number of multi-directional X-ray computed tomography (CT) data; and
   reconstructing an image for the multi-directional X-ray CT data using a neural network learned in each of an image domain and a sinogram domain,
   wherein the reconstructing of the image includes:
      obtaining initial reconstruction images from the multi-directional X-ray CT data using a predetermined analytic algorithm;

denoising the initial reconstruction images using a neural network of the image domain;
generating projection view data by projecting the denoised initial reconstruction images;
obtaining sinogram data denoised from the projection view data using a neural network of the sinogram domain; and
reconstructing the image for the multi-directional X-ray CT data from the denoised sinogram data using the analytic algorithm.

2. The image processing method of claim 1, wherein the neural network of the image domain denoises the initial reconstruction images using a learning model for mapping between a predetermined artifact-corrupted image and model-based iterative reconstruction (MBIR) instruction in the image domain.

3. The image processing method of claim 1, wherein the neural network of the sinogram domain provides the sinogram data denoised from the projection view data using a learning model for mapping between sinogram data and projection data in the sinogram domain.

4. The image processing method of claim 1, wherein the reconstructing of the image includes:
reconstructing the image using an analytic algorithm including a Feldkamp-Davis-Kress (FDK) algorithm and a filtered-backprojection (FBP) algorithm.

5. The image processing method of claim 1, wherein the neural network includes a convolutional framelet-based neural network.

6. The image processing method of claim 1, wherein the neural network includes a multi-resolution neural network including a pooling layer and an unpooling layer.

7. The image processing method of claim 6, wherein the neural network includes a bypass connection from the pooling layer to the unpooling layer.

8. The image processing method of claim 1, wherein the reconstructing of the image includes:
reconstructing the image for the multi-directional X-ray CT data by using the image reconstructed using a neural network of the image domain and a neural network of the sinogram domain as label data of the neural network of the image domain.

9. An image processing method, comprising:
receiving computed tomography (CT) data; and
reconstructing an image for the CT data using a neural network learned in each of an image domain and a sinogram domain,
wherein the reconstructing of the image includes:
obtaining an initial reconstruction image from the CT data using a predetermined analytic algorithm;
denoising the initial reconstruction image using the neural network of the image domain;
generating projection view data by projecting the denoised initial reconstruction image;
obtaining sinogram data denoised from the projection view data using the neural network of the sinogram domain; and
reconstructing the image for the CT data from the denoised sinogram data using the analytic algorithm.

10. An image processing device, comprising:
a reception unit configured to receive a predetermined number of multi-directional X-ray computed tomography (CT) data; and
a reconstruction unit configured to reconstruct an image for the multi-directional X-ray CT data using a neural network learned in each of an image domain and a sinogram domain,
wherein the reconstruction unit obtains initial reconstruction images from the multi-directional X-ray CT data using a predetermined analytic algorithm, denoises the initial reconstruction images using the neural network of the image domain, generates projection view data by projecting the denoised initial reconstruction images, obtains sinogram data denoised from the projection view data using the neural network of the sinogram domain, and reconstructs the image for the multi-directional X-ray CT data from the denoised sinogram data using the analytic algorithm.

11. The image processing device of claim 10, wherein the neural network of the image domain denoises the initial reconstruction images using a learning model for mapping between a predetermined artifact-corrupted image and model-based iterative reconstruction (MBIR) instruction in the image domain.

12. The image processing device of claim 10, wherein the neural network of the sinogram domain provides the sinogram data denoised from the projection view data using a learning model for mapping between sinogram data and projection data in the sinogram domain.

13. The image processing device of claim 10, wherein the reconstruction unit reconstructs the image using an analytic algorithm including a Feldkamp-Davis-Kress (FDK) algorithm and a filtered-backprojection (FBP) algorithm.

14. The image processing device of claim 10, wherein the neural network includes a convolutional framelet-based neural network.

15. The image processing device of claim 10, wherein the neural network includes a multi-resolution neural network including a pooling layer and an unpooling layer.

16. The image processing device of claim 15, wherein the neural network includes a bypass connection from the pooling layer to the unpooling layer.

17. The image processing device of claim 10, wherein the reconstruction unit reconstructs the image for the multi-directional X-ray CT data by using the image reconstructed using a neural network of the image domain and a neural network of the sinogram domain as label data of the neural network of the image domain.

* * * * *